(12) United States Patent
Niver et al.

(10) Patent No.: US 12,297,921 B2
(45) Date of Patent: May 13, 2025

(54) ROLLOVER VENT VALVE ASSEMBLY

(71) Applicant: Bemis Manufacturing Company, Sheboygan Falls, WI (US)

(72) Inventors: Michael A. Niver, Plymouth, WI (US); Michael J. Holz, West Bend, WI (US)

(73) Assignee: Bemis Manufacturing Company, Sheboygan Falls, WI (US)

( * ) Notice: Subject to any disclaimer, the term of this patent is extended or adjusted under 35 U.S.C. 154(b) by 0 days.

(21) Appl. No.: 18/546,237

(22) PCT Filed: Feb. 11, 2022

(86) PCT No.: PCT/US2022/016129
§ 371 (c)(1),
(2) Date: Aug. 11, 2023

(87) PCT Pub. No.: WO2022/174042
PCT Pub. Date: Aug. 18, 2022

(65) Prior Publication Data
US 2024/0159324 A1 May 16, 2024

Related U.S. Application Data

(60) Provisional application No. 63/148,325, filed on Feb. 11, 2021.

(51) Int. Cl.
*F16K 24/04* (2006.01)
*B60K 15/035* (2006.01)
*B60K 15/03* (2006.01)

(52) U.S. Cl.
CPC .......... *F16K 24/044* (2013.01); *B60K 15/035* (2013.01); *B60K 2015/03282* (2013.01);
(Continued)

(58) Field of Classification Search
CPC ........ F16K 24/044; F16K 24/04; F16K 24/06; F16K 27/07; F16K 17/36;
(Continued)

(56) References Cited

U.S. PATENT DOCUMENTS 2,396,233 A * 3/1946 Abrams ............. B60K 15/0406
137/43
3,976,096 A 8/1976 Kass et al.
(Continued)

FOREIGN PATENT DOCUMENTS

FR 2766134 A1 1/1999

OTHER PUBLICATIONS

International Search Report and Written Opinion for Application No. PCT/US2022/16129, dated May 18, 2022 (12 pages).
(Continued)

*Primary Examiner* — Craig J Price
(74) *Attorney, Agent, or Firm* — Michael Best & Friedrich LLP

(57) ABSTRACT

A valve assembly includes a body engageable with a container, an internal cavity, and a vent outlet. A wall divides the internal cavity into a first chamber and a second chamber, the first chamber being between the bottom end of the body and the wall, and the second chamber being between the top end of the body and the wall, in communication with the vent outlet. An umbrella valve is coupled to the wall and has a central passage and an umbrella portion. The umbrella portion is positioned within the second chamber and is configured to engage a top side of the wall. The umbrella portion is configured to deform away from the top side of the wall to vent a gas along a first pathway from the first chamber to the vent outlet in response to pressure within the first chamber exceeding a cracking pressure of the umbrella valve.

20 Claims, 11 Drawing Sheets

(52) U.S. Cl.
CPC . *B60K 2015/03289* (2013.01); *Y10T 137/053* (2015.04); *Y10T 137/0874* (2015.04); *Y10T 137/6004* (2015.04)

(58) Field of Classification Search
CPC ........... B60K 2015/03282; B60K 2015/03289; B60K 2015/03263; B60K 15/03519; B60K 15/035; B60K 15/03504; B60K 15/03289; Y10T 137/053; Y10T 137/0753; Y10T 137/0777; Y10T 137/0874; Y10T 137/3099; Y10T 137/6004; Y10T 137/7358; Y10T 137/7423; Y10T 137/7426; Y10T 137/86324; Y10T 137/86332; Y10T 29/49405; F16L 47/02; F16L 47/14; F02M 37/017; F02M 37/0076; F24D 19/08–1096
USPC ..... 137/15.26, 38, 39, 43, 315.08, 202, 409, 137/429, 430, 587, 588, 843–860; 220/86.2, 745, 746; 141/59, 198, 202, 141/229; 123/516, 518, 198 D, 520; 236/52–66
See application file for complete search history.

(56) References Cited

U.S. PATENT DOCUMENTS

| | | | |
|---|---|---|---|
| 4,694,847 A * | 9/1987 | Szlaga | B60K 15/03519 137/39 |
| 4,735,226 A * | 4/1988 | Szlaga | B60K 15/03519 137/43 |
| 4,750,314 A | 6/1988 | Mietz et al. | |
| 4,905,726 A * | 3/1990 | Kasugai | B60K 15/03519 137/433 |
| 4,921,071 A * | 5/1990 | Lonnborg | F01M 11/06 184/45.1 |
| 5,507,318 A | 4/1996 | Israelson | |
| 5,518,018 A * | 5/1996 | Roetker | B60K 15/03519 137/493 |
| 5,678,590 A * | 10/1997 | Kasugai | B60K 15/03519 137/630.14 |
| 5,944,044 A * | 8/1999 | King | F16K 24/044 137/202 |
| 6,230,732 B1 * | 5/2001 | Ganachaud | F16K 17/36 137/39 |
| 6,561,211 B2 | 5/2003 | Devall | |
| 7,082,967 B2 | 8/2006 | Sarajian et al. | |
| 7,770,593 B2 * | 8/2010 | Moses | B60K 15/035 137/202 |
| 7,900,648 B2 | 3/2011 | Rouxel et al. | |
| 8,166,995 B2 | 5/2012 | Arnalsteen et al. | |
| 8,485,215 B2 | 7/2013 | Arnalsteen et al. | |
| 8,720,471 B2 * | 5/2014 | Yasuda | F16K 24/044 137/202 |
| 8,776,823 B2 * | 7/2014 | Suehiro | F16K 24/06 137/202 |
| 10,041,450 B2 | 8/2018 | Walkowski et al. | |
| 2002/0062861 A1 | 5/2002 | Devall | |
| 2005/0279406 A1 * | 12/2005 | Atwood | F16K 31/0655 137/39 |
| 2009/0107561 A1 | 8/2009 | Miura et al. | |
| 2009/0211649 A1 | 8/2009 | Miura et al. | |
| 2011/0315240 A1 | 12/2011 | Müller et al. | |
| 2015/0090346 A1 | 4/2015 | Erdmann et al. | |

OTHER PUBLICATIONS

Minivalve, "Duckbill/Umbrella Combination Valves, How they Work!" earliest available on Mar. 19, 2020, http://www.minivalve.com/newsite/index.php/en/by-type/duckbill-umbrella-combination-valves/how-they-work.

* cited by examiner

ROLLOVER VENT VALVE ASSEMBLY

CROSS REFERENCE TO RELATED APPLICATIONS

This application is a U.S. National Phase application of International Application No. PCT/US2022/016129, filed Feb. 11, 2022, which claims priority to U.S. Provisional Application No. 63/148,325, filed Feb. 11, 2021, the entire contents of both of which are herein incorporated by reference.

FIELD

The present invention relates to vent valve assemblies for fluid containers, and more particularly to vent valve assemblies with rollover protection.

BACKGROUND

Vent valve assemblies are typically positioned on an upper wall of a fluid container (e.g., a gasoline tank) to selectively allow vapors to be released from the fluid tank if the tank becomes over pressurized and/or to allow air to enter the fluid tank if a vacuum pressure is developed within the tank. Some vent valve assemblies, which may be referred to as rollover vent valve assemblies, are configured to create a seal in response to the fluid tank being inverted, tipped to a certain angle, or to a portion of the vent valve assembly being submerged by the fluid in the tank. Rollover vent valve assemblies may thus inhibit fluid from leaking out of the vent valve assembly in the event of a rollover.

SUMMARY

The present disclosure provides, in one aspect, a valve assembly configured to be coupled to a container. The valve assembly includes a body engageable with the container, the body having a top end, a bottom end spaced from the top end, an internal cavity defined between the first and second ends, and a vent outlet. The valve assembly also includes a wall dividing the internal cavity into a first chamber and a second chamber, the first chamber defined between the bottom end of the body and the wall, the second chamber defined between the top end of the body and the wall, and the second chamber in communication with the vent outlet. A first aperture extends through the wall between the first chamber and the second chamber, and a second aperture extends through the wall between the first chamber and the second chamber. The second aperture is offset from the first aperture. The valve assembly also includes an umbrella valve coupled to the wall and having a central passage extending through the first aperture and an umbrella portion extending radially outwardly from the central passage. The umbrella portion is positioned within the second chamber and is configured to engage a top side of the wall to selectively seal the second aperture. The valve assembly also includes a float positioned within the first chamber and having an engagement portion that is insertable into the central passage of the umbrella valve to seal the first aperture. The umbrella portion is configured to deform away from the top side of the wall to vent a gas along a first pathway from the first chamber to the vent outlet via the second aperture in response to pressure within the first chamber exceeding a cracking pressure of the umbrella valve.

In some embodiments, the float is moveable between a first position, in which the engagement portion is spaced from the central passage of the umbrella valve to permit venting of the gas along a second pathway from the first chamber to the vent outlet via the first aperture, and a second position, in which the engagement portion seals the central venting aperture to inhibit the gas from flowing through the first aperture.

In some embodiments, a head weight is positioned on a top side of the central passage.

In some embodiments, the head weight is spherical.

In some embodiments, the umbrella valve includes a groove adjacent the top side of the central passage, and the second pathway extends through the groove.

In some embodiments, the valve assembly further includes an end cap coupled to the body to enclose the first chamber, and a spring positioned between the end cap and the float. The spring is configured to urge the float towards engagement with a bottom side of the central passage.

In some embodiments, the float defines a longitudinal axis, the float is movable along the longitudinal axis between the first position and the second position, and the spring is configured to move the float to the second position in response to the longitudinal axis being tipped beyond a threshold tip angle. The threshold tip angle may be between 15 degrees and 85 degrees relative to vertical in some embodiments.

In some embodiments, the valve assembly includes a liquid outlet coupled to the body, the liquid outlet having a first end portion extending outside of the container and a second end portion positioned within the container, and a pick up tube coupled to the second end portion of the liquid outlet such that liquid from the container is able to be drawn out of the liquid outlet via the pick up tube.

In some embodiments, the liquid outlet extends parallel to the vent outlet.

In some embodiments, the valve assembly includes a housing insert positioned within the internal cavity of the body, and the housing insert defines the wall that separates the internal cavity into the first chamber and the second chamber.

In some embodiments, the float is movable to the second position in response to liquid from the container submerging at least a portion of the float.

In some embodiments, the umbrella valve is made of fluorosilicone rubber.

The present disclosure provides, in another independent aspect, a valve assembly configured to be coupled to a container. The valve assembly includes a body engageable with the container, the body having a top end, a bottom end spaced from the top end, an internal cavity defined between the first and second ends, and a vent outlet, a wall dividing the internal cavity into a first chamber and a second chamber, the first chamber defined between the bottom end of the body and the wall, the second chamber defined between the top end of the body and the wall, and the second chamber is in communication with the vent outlet, a first aperture extending through the wall between the first chamber and the second chamber, a second aperture extending through the wall between the first chamber and the second chamber, the second aperture offset from the first aperture, and a valve. The valve includes a first state in which a gas is able to flow along a first pathway from the first chamber to the vent outlet via the first aperture and a second state in which the first pathway is blocked. The gas is able to flow along a second pathway from the first chamber to the vent outlet via the second aperture in response to pressure within the first chamber exceeding a cracking pressure of the valve when the valve is in the second state.

In some embodiments, the valve includes a float and an umbrella valve, the float is spaced from the umbrella valve in the first state, and the float engages the umbrella valve in the second state.

In some embodiments, the valve includes a head weight positioned on a top side of the umbrella valve, the umbrella valve includes a groove adjacent the top side of the umbrella valve, and the first pathway extends through the groove.

In some embodiments, the float is movable along a longitudinal axis, and the valve is configured such that the float moves into engagement with the umbrella valve in response to the longitudinal axis being tipped beyond a threshold tip angle, the threshold tip angle being between 15 degrees and 85 degrees relative to vertical.

In some embodiments, the float is movable into engagement with the umbrella valve in response to liquid from the container submerging at least a portion of the float.

The present disclosure provides, in another aspect, a method of assembling a valve assembly, including providing a body having a top end, a bottom end spaced from the top end, and an internal cavity defined between the top and bottom ends, the body defining a vent outlet, inserting a central passage of an umbrella valve into a first aperture formed in a wall until an umbrella portion of the umbrella valve, which extends radially outwardly from the central passage, engages a top side of the wall to seal a second aperture offset from the first aperture, inserting a float into a first chamber defined below the wall, the float having an engagement portion that is sized to be received within the central passage of the umbrella valve, inserting a spring into the first chamber, and coupling an end cap to the bottom end of the body to secure the float and the spring within the first chamber such that the spring biases the float toward the central passage of the umbrella valve.

In some embodiments, the wall is part of a housing insert, and the method further includes inserting the housing insert into the internal cavity through the second end of the body before coupling the end cap to the second end of the body, such that the end cap retains the housing insert within the internal cavity.

In some embodiments, the end cap is a first end cap, and the method further includes inserting a head weight into a second chamber defined above the wall, and coupling a second end cap to the top end of the body to enclose the head weight within the second chamber.

Additional features and aspects of the present disclosure will become apparent upon consideration of the following description and the accompanying drawings.

Before any independent embodiments of the disclosure are explained in detail, it is to be understood that the disclosure is not limited in its application to the details of construction and the arrangement of components set forth in the following description or illustrated in the following drawings. The disclosure is capable of other independent embodiments and of being practiced or of being carried out in various ways. Also, it is to be understood that the phraseology and terminology used herein is for the purpose of description and should not be regarded as limiting.

DETAILED DESCRIPTION

Figure 1:
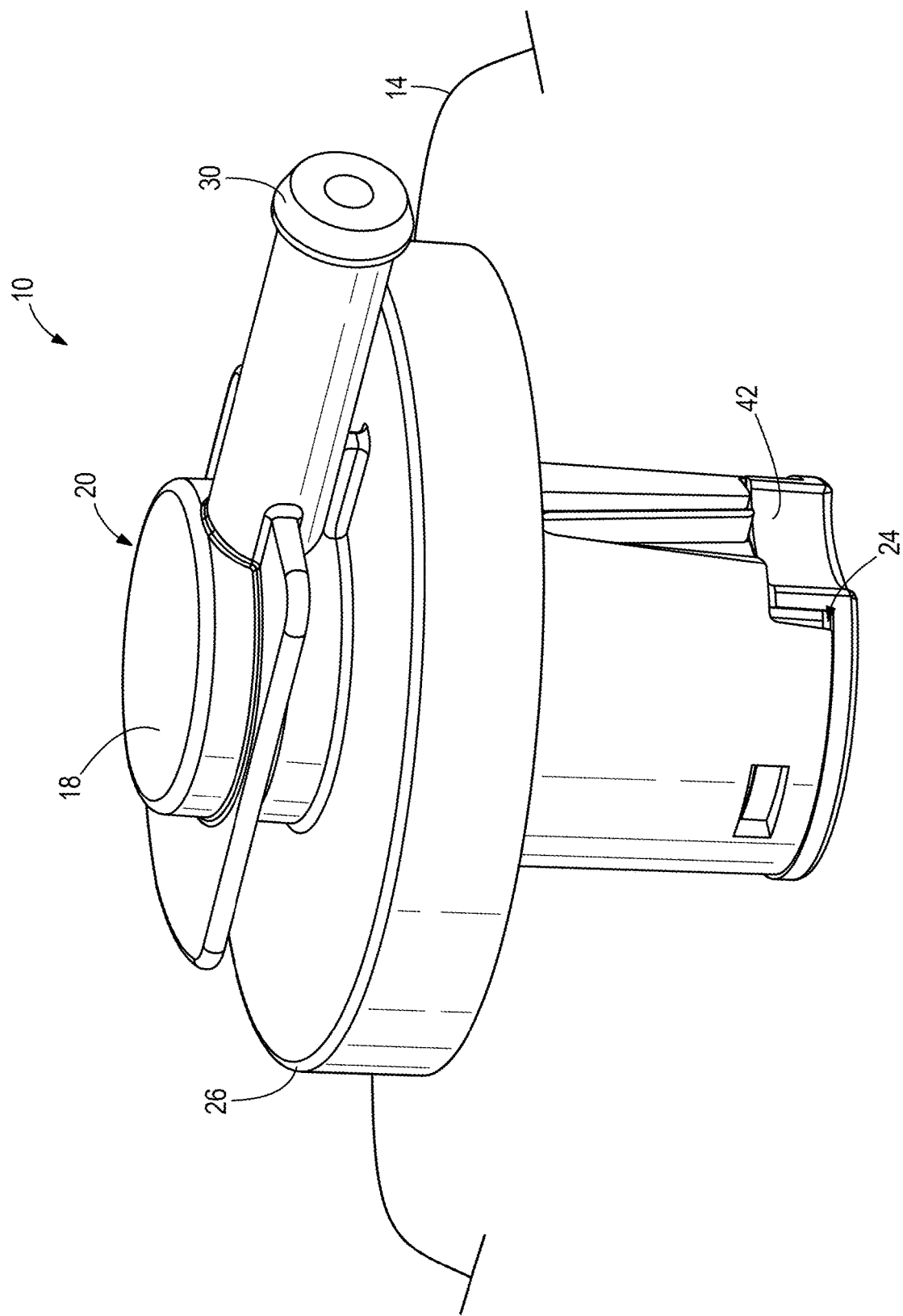
FIG. 1 is a perspective view illustrating a rollover vent valve assembly according to an embodiment of the present disclosure.
Figure 2:
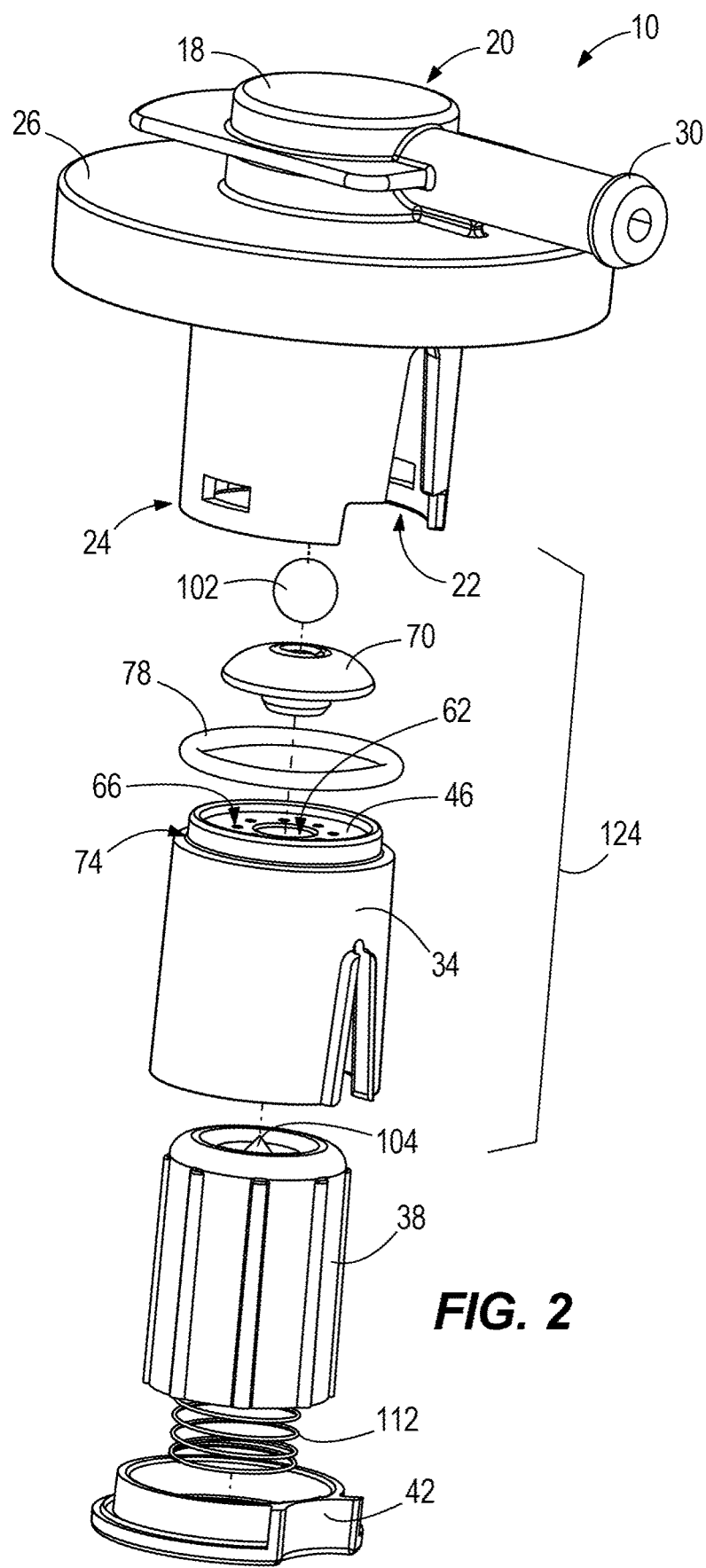
FIG. 2 is an exploded view of the rollover vent valve assembly of FIG. 1.
Figure 3:
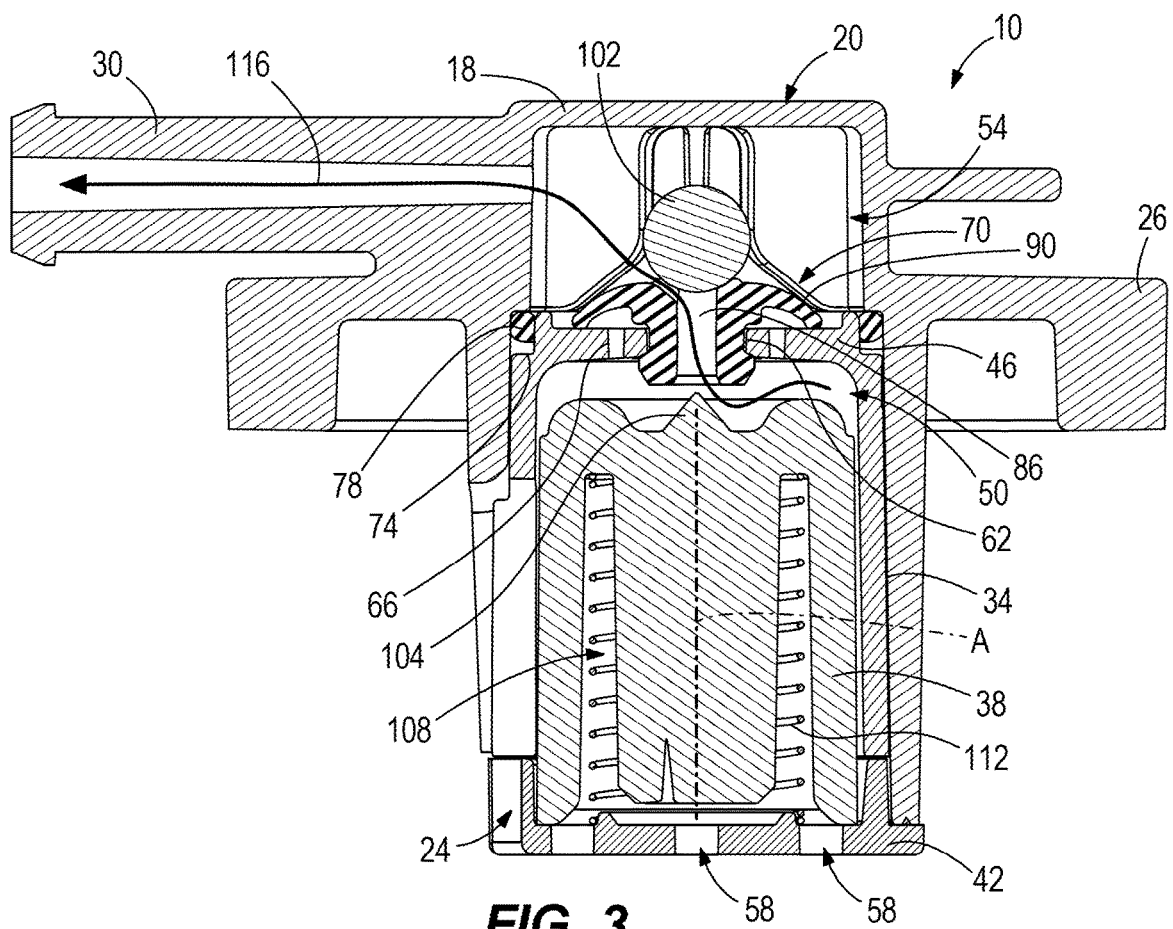
FIG. 3 is a cross-sectional view of the rollover vent valve assembly of FIG. 1, illustrating an umbrella valve of the valve assembly in a first venting state.

FIGS. 1-3 illustrate a rollover vent valve assembly 10 that may be coupled to a container 14 (illustrated schematically in FIG. 1) to selectively vent gas (e.g., air, fuel vapor, etc.) from the container 14. As used herein, the term "gas" encompasses purely gaseous phase substances as well as vapors. In some embodiments, the container 14 may be a fuel tank, such as a standalone fuel tank or a fuel tank incorporated into a vehicle or other powered machine.

The illustrated rollover vent valve assembly 10 (or simply "valve assembly 10") includes a body 18 having a first end or top end 20 and a second end or bottom end 24 spaced from the top end 20. (FIG. 1). The body 18 defines an internal cavity 22 (FIG. 2), a mounting portion 26, and a vent outlet 30. The body 18 may be formed of a thermoplastic polymer such as High Density Polyethylene (HDPE). This allows the mounting portion 26 to be coupled to the container 14 via a fusion-bonding process, such as hot plate welding, with the bottom end 24 of the body 18 disposed inside of the container 14. In other embodiments, the body 18 may be formed from other weldable materials or coupled to the container 14 other ways.

The illustrated vent outlet 30 is sized and shaped to receive a vent hose (not shown) that directs vented gases from the container 14 to the surrounding atmosphere or to a vapor collection system. For example, the vent outlet 30 may include a ¼-inch barb fitting that is insertable into an end of the vent hose. In other embodiments, the vent hose may be coupled to the vent outlet 30 in other ways, or the vent hose may be omitted such that the vent outlet 30 may discharge vented gases directly to the surrounding atmosphere.

With reference to FIGS. 2 and 3, the valve assembly 10 includes a housing insert 34 positioned within the internal cavity 22, a float 38 at least partially received within the housing insert 34, and an end cap 42 that is coupled to the bottom end 24 of the body 18 to secure the housing insert 34 and the float 38 within the body 18. The housing insert 34 includes a wall 46 that divides the internal cavity 22 into a first chamber 50 and a second chamber 54 (FIG. 3).

More specifically, the first chamber 50 is defined between the end cap 42 and the wall 46 (i.e. below the wall 46 in the orientation of FIG. 3) and accommodates the float 38. The first chamber 50 is sized to accommodate movement of the float 38 along a longitudinal axis A of the float 38. The second chamber 54 is defined between the wall 46 and the top end 20 of the body 18 (i.e. above the wall 46) and is in fluid communication with the vent outlet 30. In the illustrated embodiment, the housing insert 34 includes an outer ridge 74 that is sized to receive an O-ring 78 to provide a seal between the second chamber 54 and the first chamber 50 at an outer periphery of the housing insert 34.

Best illustrated in FIG. 3, the end cap 42 includes a plurality of apertures 58 so fluid from the container 14 may enter the first chamber 50 of the valve assembly 10. The wall 46 defines a first or central aperture 62 and a plurality of secondary apertures 66 surrounding the first aperture 62. In the illustrated embodiment, the first aperture 62 is centrally located on the wall 46, such that the axis A passes through the center of the first aperture 62. The secondary apertures 66 concentrically surround the first aperture 62. In other embodiments, the secondary apertures 66 may be spaced relative to the first aperture 62 in other ways. The first aperture 62 is sized to receive an umbrella valve 70 that selectively restricts or establishes fluid communication between the second chamber 54 and the first chamber 50, as described in greater detail below.

Figure 4:
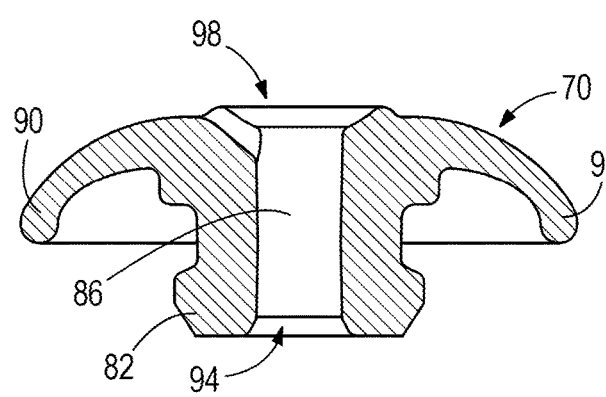
FIG. 4 is a cross-sectional view of the umbrella valve of FIG. 3.
Figure 5:
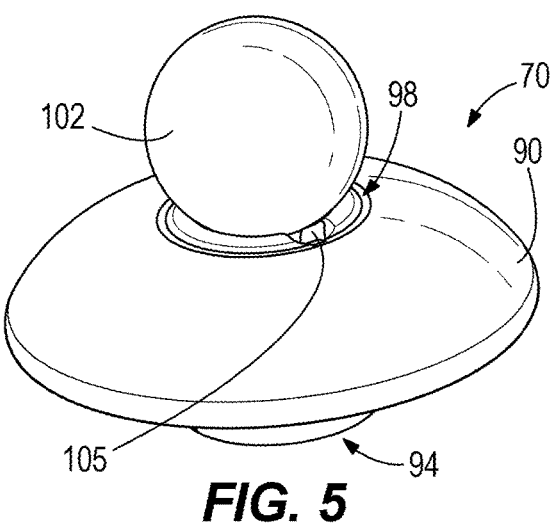
FIG. 5 is a perspective view the umbrella valve of FIG. 4 with a head weight positioned on a top side of the umbrella valve.

FIGS. 4 and 5 illustrate an embodiment of the umbrella valve 70, which is made of a resilient material and preferably an elastomeric material such as a fluorosilicone "FVMQ" rubber. FVMQ rubber is heat resistant, maintains flexibility at lower temperatures, and is also resistant to fuel and other hydrocarbons. As such, FVMQ rubber is a particularly advantageous material for the umbrella valve 70 when the rollover vent valve assembly 10 is incorporated into a fuel tank assembly. In other embodiments, however, the umbrella valve 70 may be made of other resilient materials.

The illustrated umbrella valve 70 includes a body 82 defining a central passage 86 extending axially therethrough and a circumferential or umbrella portion 90. A bottom side 94 of the central passage 86 is sized to receive an engagement portion 104—which is formed as a pointed tip in the illustrated embodiment—of the float 38 (FIG. 3). A top side 98 of the central passage 86 is sized to receive a head weight 102 (FIG. 5).

The head weight 102 selectively engages the central passage 86 to restrict the flow of fluid through the central passage 86 of the umbrella valve 70. In the illustrated embodiment, the body 82 includes a groove 105 adjacent the top side 98 of the central passage 86 that communicates with the central passage 86 (FIG. 5). The groove 105 has a small cross-sectional area relative to the central passage 86. When the head weight 102 is seated on the top side 98 of the central passage 86, vented gas (e.g., vapor, etc.) may flow past the head weight 102 through the groove 105 (FIG. 3). In the illustrated embodiment, the head weight 102 is spherical (e.g., a stainless-steel ball bearing). In other embodiments, the head weight 102 may be made of other materials and/or in other shapes.

Figure 7:
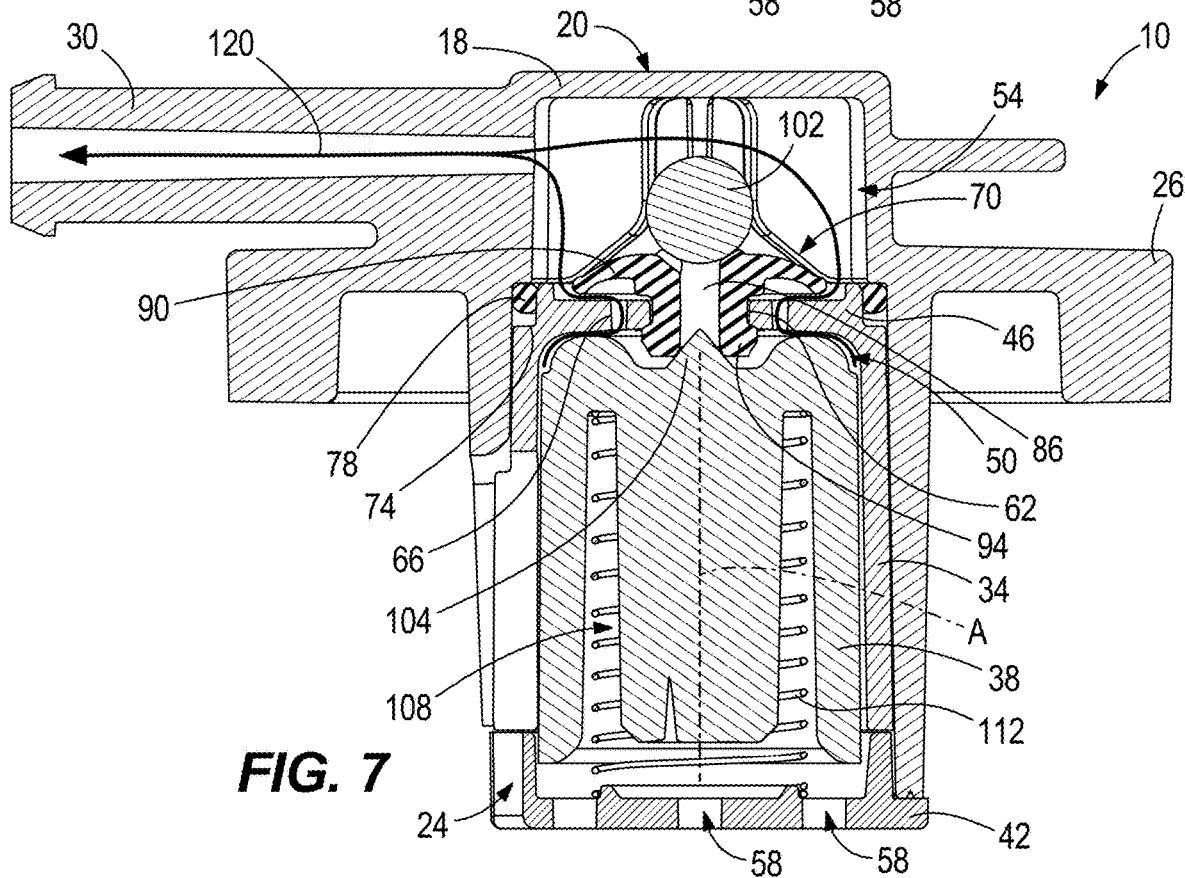
FIG. 7 is a cross-sectional view of the rollover vent valve assembly of FIG. 1, illustrating the umbrella valve in a second venting state.

With reference to FIG. 3, the umbrella valve 70 is inserted through the first aperture 62 such that the central passage 86 extends through the wall 46 and defines a primary venting path through the wall 46. The umbrella portion 90 is positioned above the wall 46 within the second chamber 54 of the valve assembly 10. An outer periphery of the umbrella portion 90 engages the upper surface of the wall 46 to cover or seal the secondary apertures 66 formed in the wall 46. The umbrella portion 90 may deform in response to elevated pressure within the container 14 to form a secondary venting path through the secondary apertures 66 that, when passing through the wall 46, is parallel to the primary venting path (FIG. 7). Thus, the construction of the umbrella valve 70 allows for additional venting, bypassing the central passage 86, to prevent pressure within the container 14 from increasing beyond a designed crack pressure of the umbrella valve 70.

With continued reference to FIG. 3, the float 38 defines an annular receiving cavity 108 extending along the longitudinal axis A of the float 38 and sized to receive a spring 112 (e.g., a coil spring). The spring 112 is positioned between the end cap 42 and the float 38 to bias the float 38 towards engagement with the bottom side 94 of the umbrella valve 70. In the illustrated embodiment, the spring 112 is configured to partially support the weight of the float 38. As such, when the float 38 is not surrounded by fluid (e.g., when the container 14 is upright in an ordinary operating position such that the longitudinal axis A is vertical), the gravitational weight of the float 38 compresses the spring 112, and the engagement portion 104 of the float 38 is spaced from the bottom side 94 of the umbrella valve 70. Thus, the float 38 may occupy an unsealed position, as illustrated in FIG. 3, under the influence of gravity when the container 14 is upright.

Figure 6:
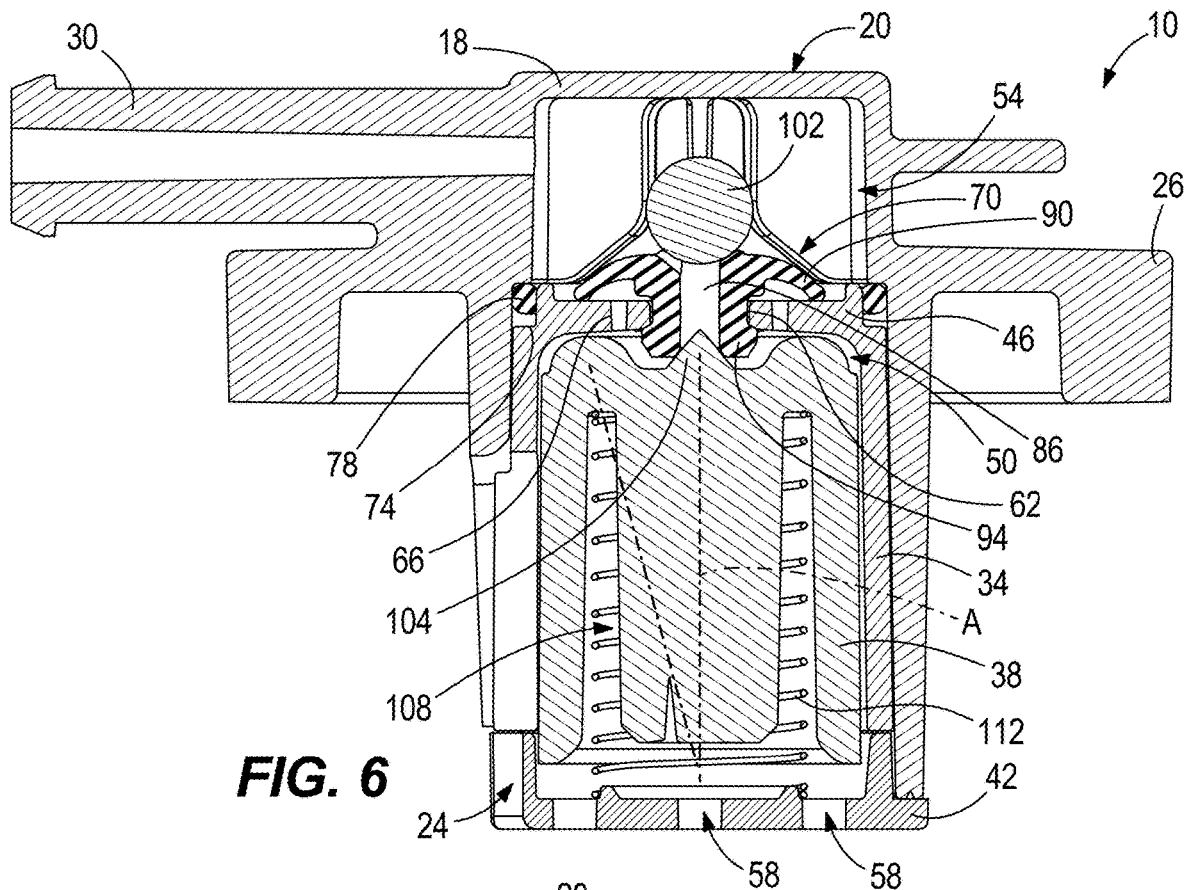
FIG. 6 is a cross-sectional view of the rollover vent valve assembly of FIG. 1, illustrating the umbrella valve in a sealed state.

When the float 38 is surrounded by fluid, a buoyancy force on the float 38, together with the biasing force of the spring 112, are sufficient to move the float 38 along the longitudinal axis A and into engagement with the central passage 86 of the umbrella valve 70, as shown in FIG. 6, to define a sealed position of the float 38. Because the portion of the weight of the float 38 acting along the longitudinal axis A decreases when the container 14 is tipped, in some embodiments, the spring 112 may move the float 38 to the sealed position if the longitudinal axis A is oriented at an angle relative to vertical that is greater than a threshold tip angle. In such embodiments, the threshold tip angle is between 15 degrees and 85 degrees. In some embodiments, the threshold tip angle is between 25 degrees and 75 degrees.

The valve assembly 10 is movable between a plurality of different operating states. For example, FIG. 3 illustrates a first venting state of the valve assembly 10. In the first venting state, the engagement portion 104 of the float 38 is spaced from the central passage 86 of the umbrella valve 70, and the head weight 102 is positioned on the top side 98 of the umbrella valve 70. The valve assembly 10 may occupy the first venting state when the container 14 is in an upright or nearly upright position (such that the longitudinal axis A is oriented at an angle relative to vertical that is less than or equal to the threshold tip angle). In this position, restricted flow of vapor or gas is permitted along a flow path 116 that extends through the central passage 86 of the umbrella valve 70 and to the vent outlet 30 via the groove 105 (FIG. 5). In some embodiments, when the container 14 is being filled, the restricted flow through the groove 105 may cause a rapid rise of liquid fuel in a filler tube of the container 14. As a result, the liquid fuel may contact the filler nozzle, which may trigger an automatic shut-off mechanism to prevent over filling of the container 14. In some embodiments, air may also be drawn into the container 14 along the flow path 116 (e.g., to replace liquid fuel being consumed).

FIG. 7 illustrates a second venting state of the valve assembly 10. In the second venting state, the engagement portion 104 of the float 38 remains engaged with the bottom side 94 of the umbrella valve 70, sealing the central passage 86 (e.g., due to the container 14 being tipped and/or a fluid level within the container rising to at least partially submerge the float 38). If pressure within the container 14 increases beyond a cracking pressure of the umbrella valve 70, the umbrella portion 90 of the umbrella valve 70 deforms away from the wall 46 to open the secondary aperture 66. This allows gas/vapor to move along a secondary vent path 120 and out of the container 14 through the vent outlet 30.

Figure 8:
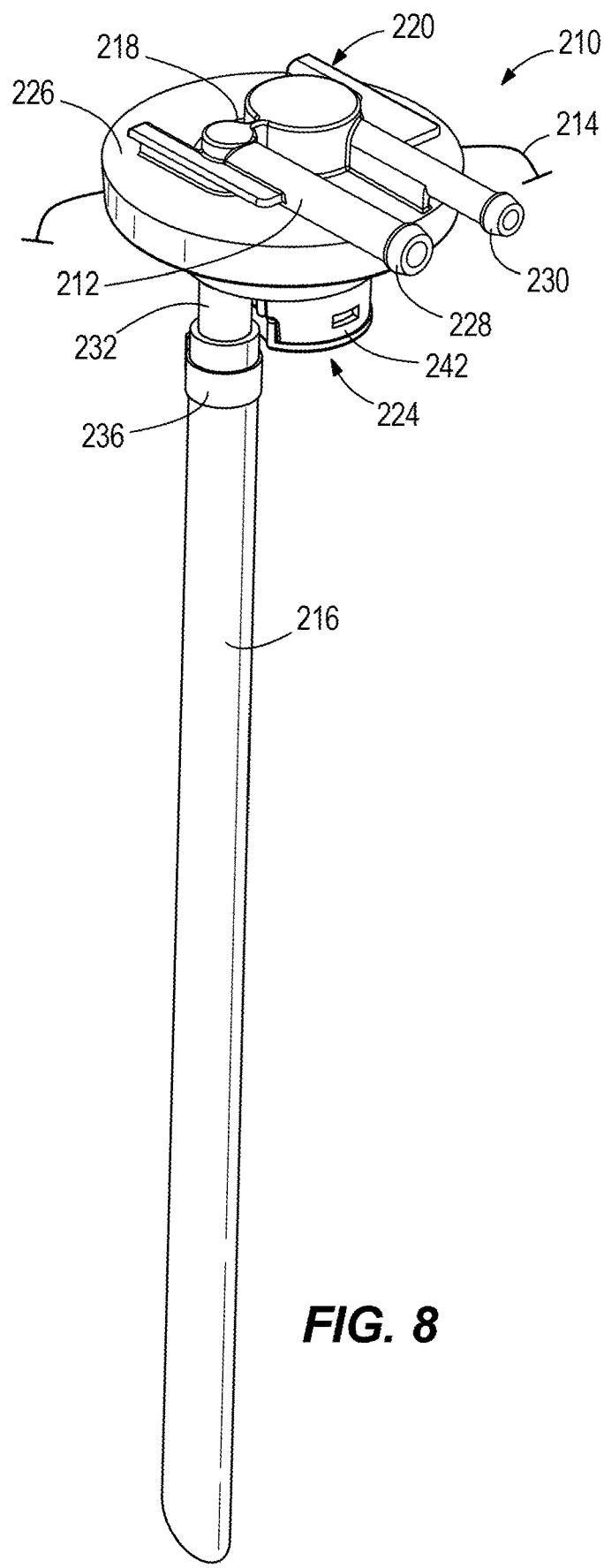
FIG. 8 is a perspective view of a rollover vent valve assembly according to another embodiment of the present disclosure.
Figure 9:
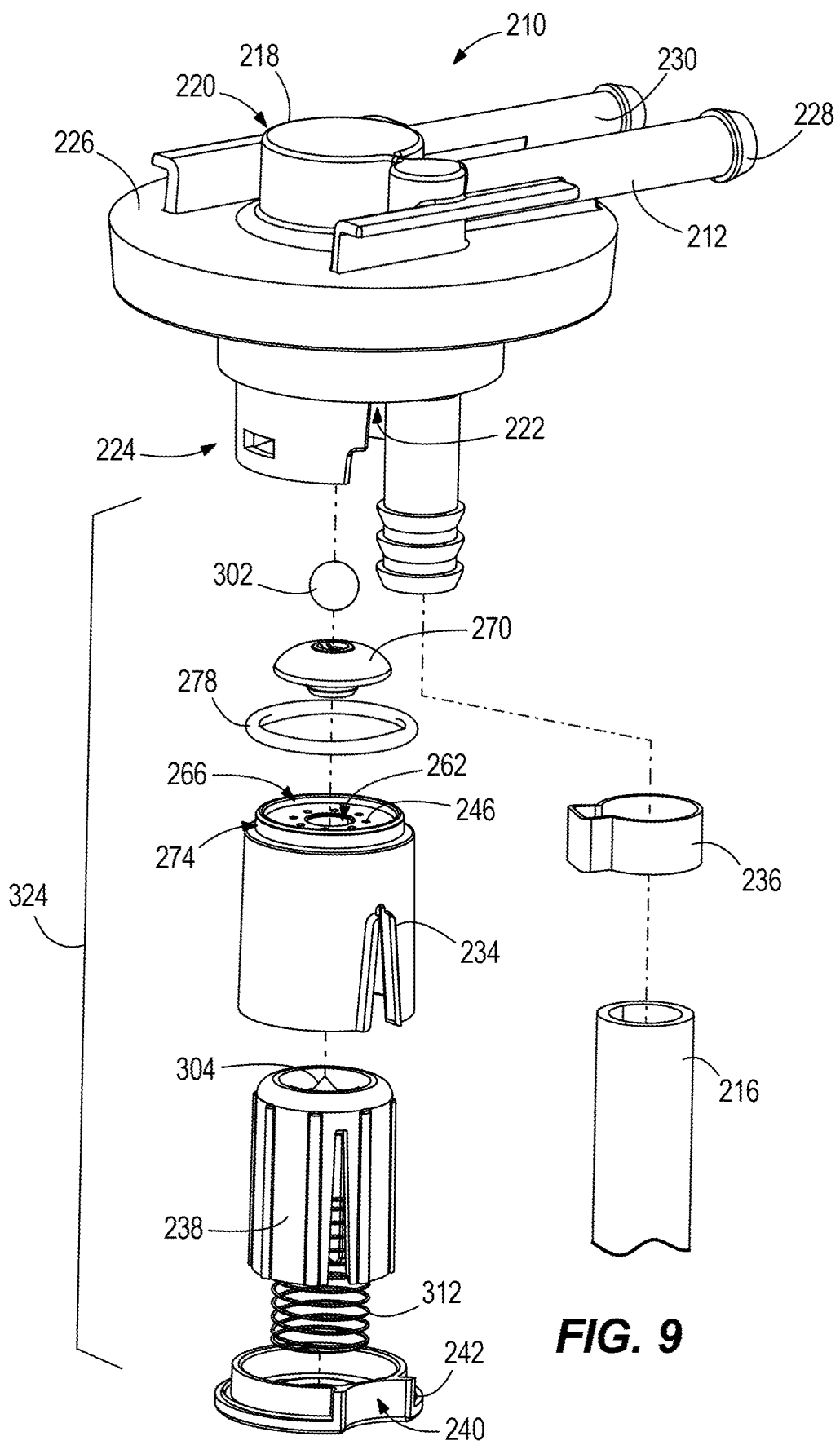
FIG. 9 is an exploded view of the rollover vent valve assembly of FIG. 8.
Figure 10:
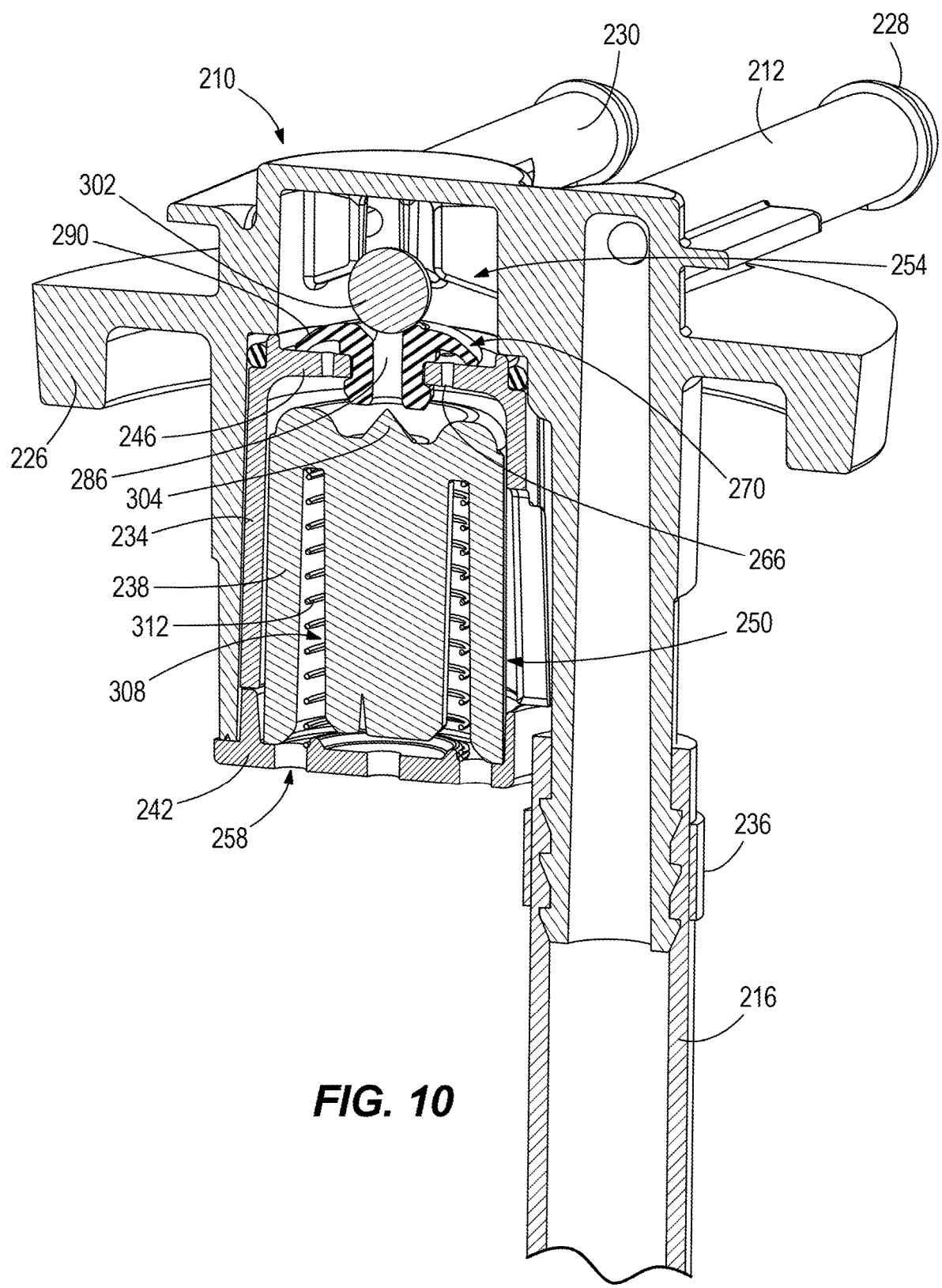
FIG. 10 is cross-sectional view of the rollover vent valve assembly of FIG. 8.

FIGS. 8-10 illustrate another embodiment of a rollover vent valve assembly 210. The valve assembly 210 is similar to the valve assembly 10 described above with reference to FIGS. 1-7, and the following description focuses primarily on differences between the valve assembly 210 and the valve assembly 10. In addition, common features and elements of the valve assembly 210 corresponding with features and elements of the valve assembly 10 are given common reference numbers plus 200.

The valve assembly 210 includes a body 218 having a first end or top end 220 and a second end or bottom end 224 spaced from the top end 220. The body 218 defines an internal cavity 222 (FIG. 9), a mounting portion 226, a vent outlet 230, and a liquid fuel outlet 212. The fuel outlet 212 is integrally formed on the body 218 and is operably coupled to a fuel pick up tube 216. The vent outlet 230 may be sized to receive a vent hose (not shown) that releases the pressure from the container 214 to the surrounding atmosphere. For example, the vent outlet 230 may include a ¼ inch barb that engages with the vent hose. The liquid fuel outlet 212 includes a first end portion 228 that is sized to receive a fuel hose (not shown) and a second end portion 232 perpendicular to the first end portion 228 and extending into the container 214. The fuel hose may be operably coupled to a fuel intake of an engine (e.g., on a vehicle). The fuel pick up tube 216 may be coupled to the second end portion 232 of the liquid fuel outlet 212 via a crimp connection 236. In the illustrated embodiment, the crimp connection 236 is constructed of HDPE material; however, the fuel pick up tube 216 may be coupled to the second end portion 232 in other ways. In some embodiments, the fuel pick up tube 216 and/or the liquid fuel outlet 212 may include a screen or filter.

In the illustrated embodiment, the first end portion 228 of the liquid fuel outlet 212 extends parallel to the vent outlet 230. In other embodiments, the first end portion 228 of the liquid fuel outlet 212 may be oriented in another position relative to the vent outlet 230 (e.g. perpendicular, offset, at an angle, etc.). The addition of the fuel pick up tube 216 and the liquid fuel outlet 212 allows the valve assembly 210 to supply liquid fuel (e.g., to an engine), while also venting vapor and gas from the tank similar the valve assembly 10. Therefore, the valve assembly 210 can be inserted into a single aperture in the container 214 without having to create an additional aperture for the fuel pick up tube 216. For the sake of brevity, the internal components and states of the valve assembly 210 are not described in detail. However, it should be appreciated that the valve assembly 210 may vent gases and vapors in a similar manner as the valve assembly 10.

Figure 11:
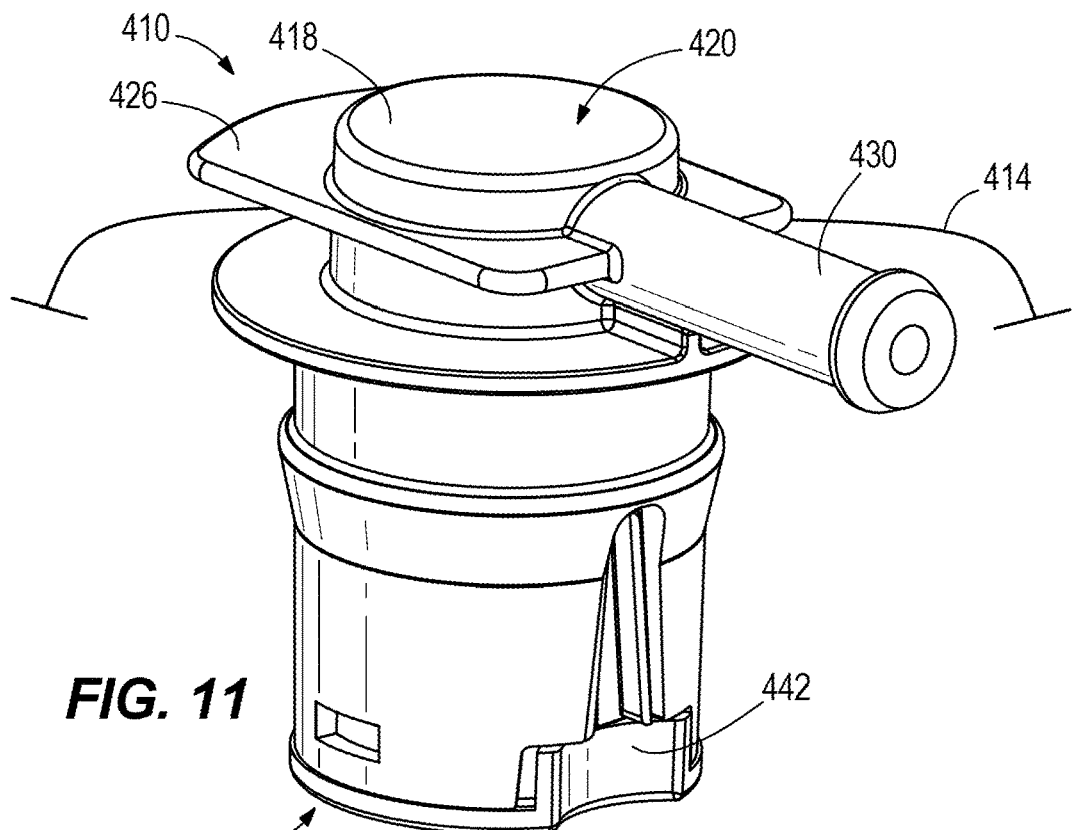
FIG. 11 is a perspective view of a rollover vent valve assembly according to another embodiment of the present disclosure.
Figure 12:
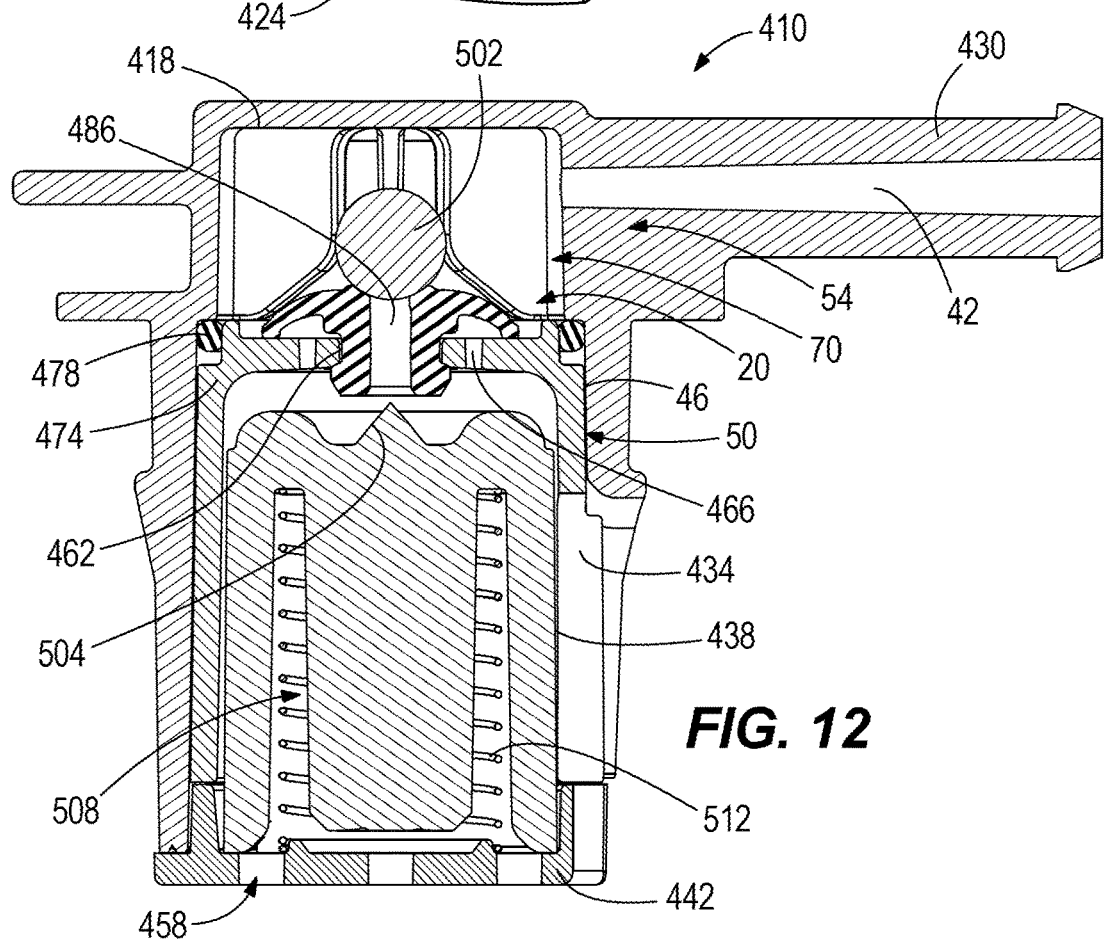
FIG. 12 is a cross-sectional view of the rollover vent valve assembly of FIG. 11.

FIGS. 11 and 12 illustrate another embodiment of a rollover vent valve assembly 410. The valve assembly 410 is similar to the valve assembly 10 described above with reference to FIGS. 1-7, and the following description focuses primarily on differences between the valve assembly 410 and the valve assembly 10. In addition, common features and elements of the valve assembly 410 corresponding with features and elements of the valve assembly 10 are given common reference numbers plus 400.

The valve assembly 410 includes a body 418 having a first end or top end 420 and a second end or bottom end 424 spaced from the top end 420. The body 418 defines a mounting portion 426, and a vent outlet 430. The vent outlet 430 may be sized to receive a vent hose (not shown) that releases the pressure from the container 414 to the surrounding atmosphere. In the illustrated embodiment, the mounting portion 426 is constructed as a grommet fitting. Therefore, the valve assembly 410 may be coupled to the container 414 via the grommet fitting mounting portion 426 without welding. For the sake of brevity, the internal components and states of the valve assembly 410 are not described in detail. However, it should be appreciated that the valve assembly 410 may vent gases and vapors in a similar manner as the valve assembly 10.

Figure 13:
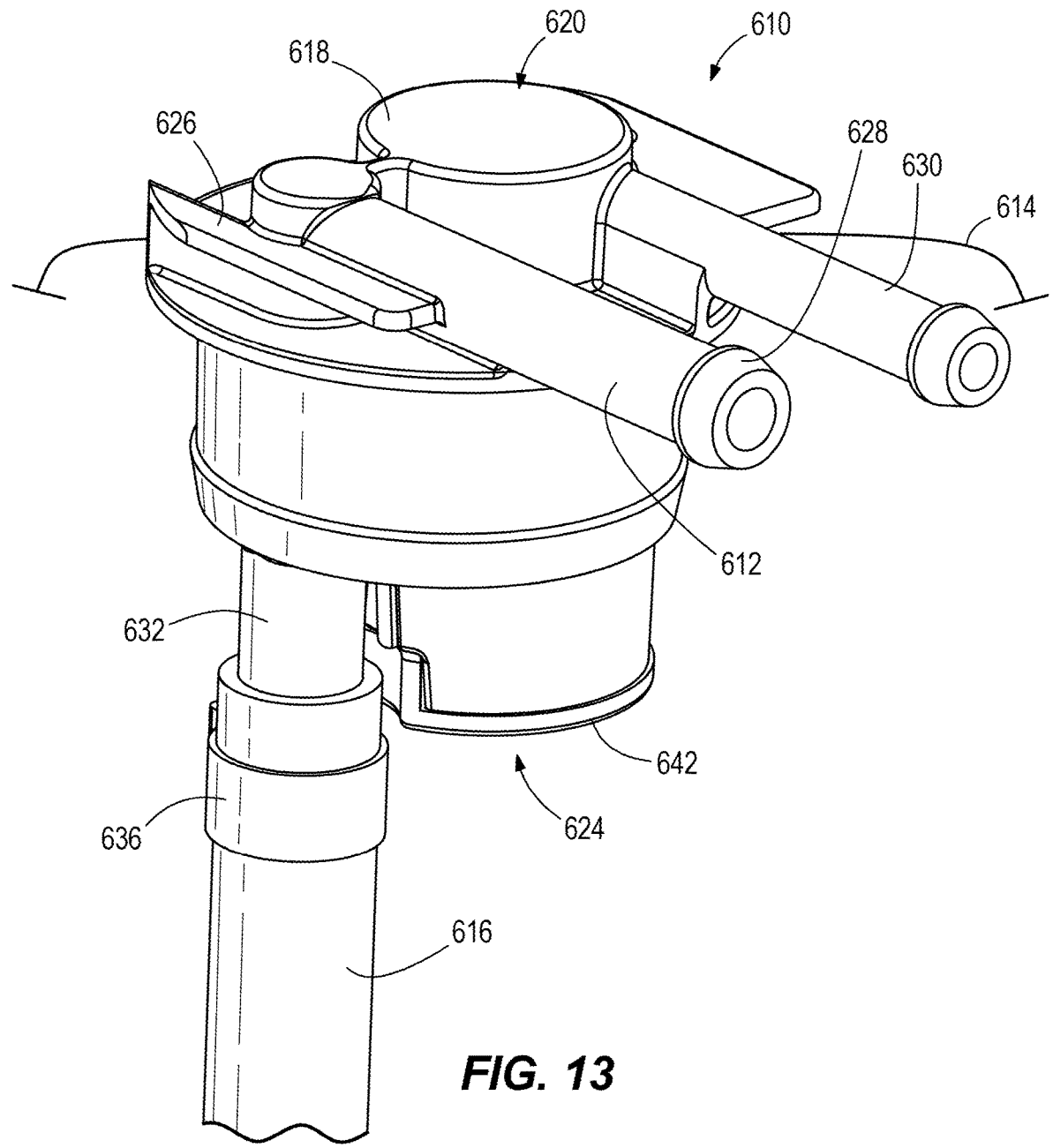
FIG. 13 is a perspective view of a rollover vent valve assembly according to another embodiment of the present disclosure.
Figure 14:
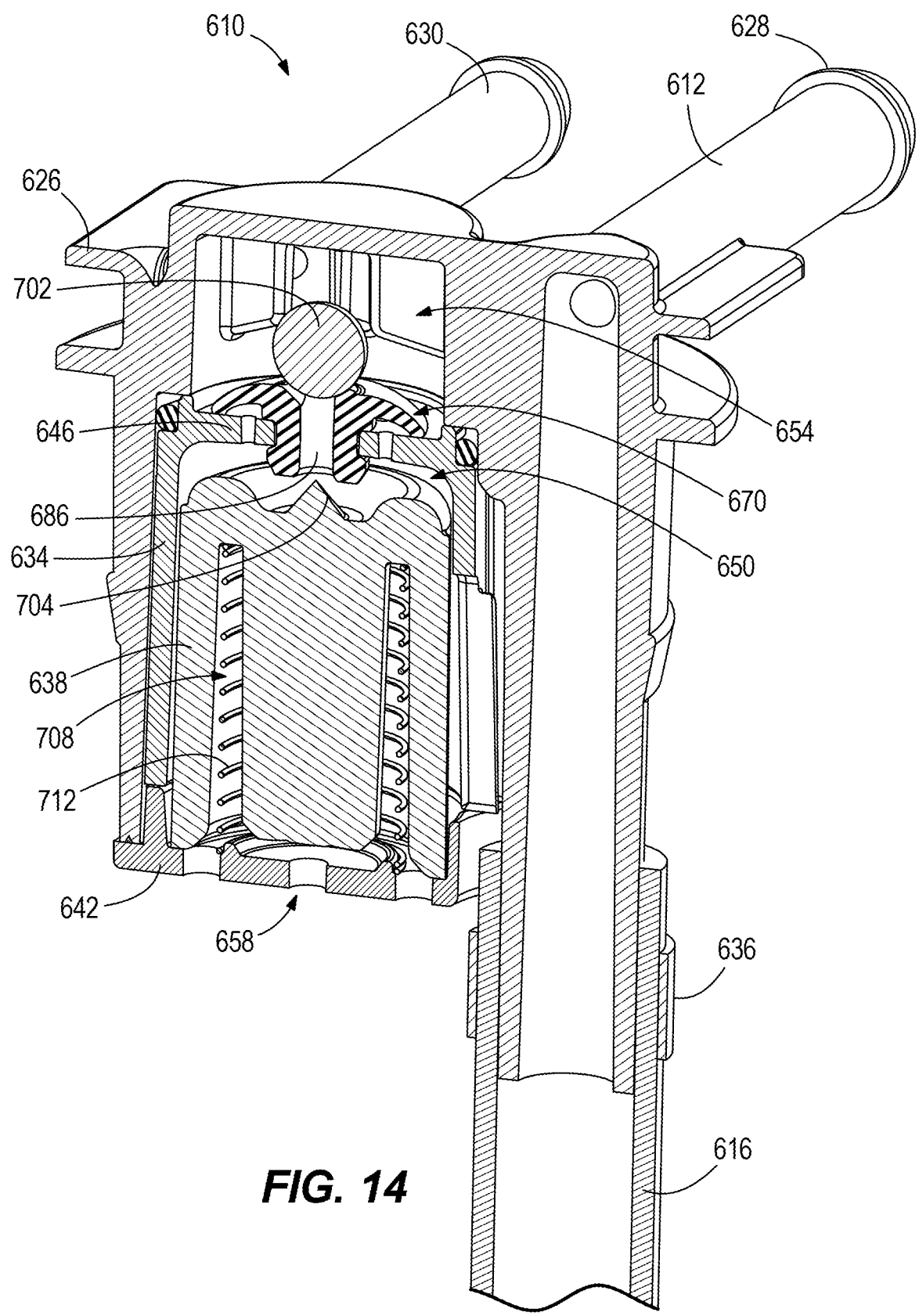
FIG. 14 is a cross-sectional view of the rollover vent valve assembly of FIG. 13.

FIGS. 13 and 14 illustrate another embodiment of a rollover vent valve assembly 610. The valve assembly 610 is similar to the valve assembly 210 described above with reference to FIGS. 8-10, and the following description focuses primarily on differences between the valve assembly 610 and the valve assembly 210. In addition, common features and elements of the valve assembly 610 corresponding with features and elements of the valve assembly 210 are given common reference numbers plus 400.

The valve assembly 610 includes a body 618 having a first end or top end 620 and a second end or bottom end 624 spaced from the top end 620. The body 218 defines a mounting portion 626, a vent outlet 630, and a liquid fuel outlet 612. The fuel outlet 612 is integrally formed on the body 618 and is operably coupled to a fuel pick up tube 616. The liquid fuel outlet 612 includes a first end portion 628 that is sized to receive a fuel hose (not shown) and a second end portion 632 that is perpendicular to the first end portion 628 and that extends within the container 614. The fuel pick up tube 616 may be coupled to the second end portion 632 of the liquid fuel outlet 612 via a crimp connector 636. In the illustrated embodiment, the mounting portion 626 is constructed as grommet fitting. Therefore, the valve assembly 610 may be coupled to the container 614 via the grommet fitting mounting portion 626 without welding. For the sake of brevity, the internal components and states of the valve assembly 610 are not described in detail. However, it should be appreciated that the valve assembly 610 may vent gases and vapors in a similar manner as the valve assembly 10.

Figure 15:
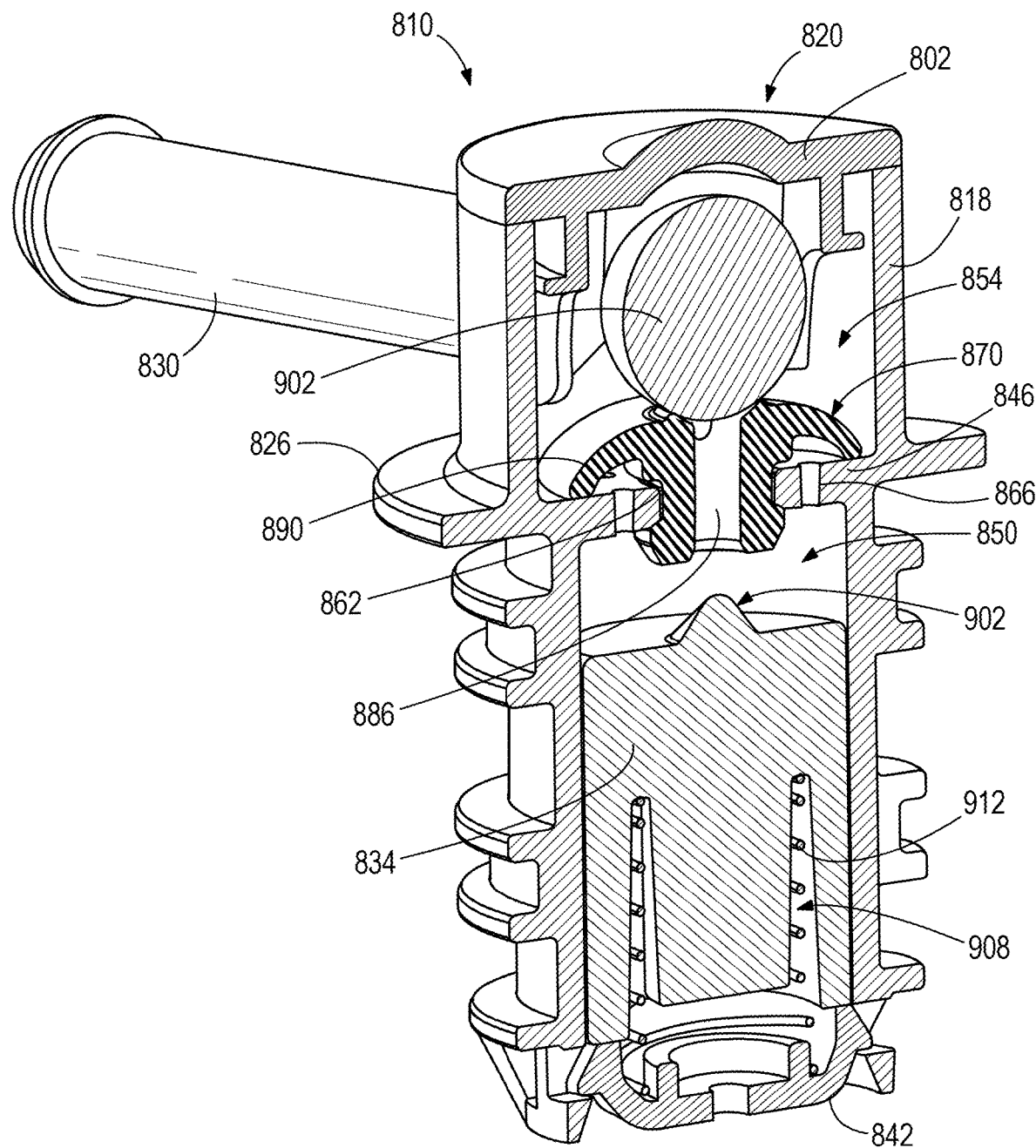
FIG. 15 is a cross-sectional view of a rollover vent valve assembly according to another embodiment of the present disclosure.

FIG. 15 illustrates another embodiment of a rollover vent valve assembly 810. The valve assembly 810 is similar to the valve assembly 10 described above with reference to FIGS. 1-7, and the following description focuses primarily on differences between the valve assembly 810 and the valve assembly 10. In addition, common features and elements of the valve assembly 810 corresponding with features and elements of the valve assembly 10 are given common reference numbers plus 800.

The valve assembly 810 includes a body 818 having a first end or top end 820 and a second end or bottom end 824 spaced from the top end 820. The body 818 defines a mounting portion 826, a vent outlet 830, and a wall 846 that separates an internal cavity of the valve assembly 810 into a first chamber 850 and a second chamber 854. The first chamber 850 is sized to receive a float 834 and a spring 912. An end cap 842 is secured to the bottom end 824 of the body 818 to secure the float 834 and the spring 912 within the first chamber 850.

The wall 846 defines a first aperture 862 and a plurality of secondary apertures 866 surrounding the first aperture 862. The first aperture 862 is sized to receive an umbrella valve 870 having a central venting portion 886 and an umbrella portion 890. A head vent weight 902 may be positioned within the second chamber 854 on a top side of the umbrella valve 870 to selectively seal the central venting portion 886. The illustrated valve assembly 810 further includes a second end cap 802 that is coupled to the top end 820 of the valve assembly 810 to enclose and seal the second chamber 854. Providing the second end cap 802 facilitates assembly of the valve assembly 810 (e.g., when installing the head vent weight 902 and umbrella valve 870).

Although the disclosure has been described in detail with reference to certain independent embodiments, variations and modifications exist within the scope and spirit of one or more independent aspects of the disclosure as described.

One or more independent features and/or advantages may be set forth in the following claims.

What is claimed is:

1. A valve assembly configured to be coupled to a container, the valve assembly comprising:
   a body engageable with the container, the body having a top end, a bottom end spaced from the top end, an internal cavity defined between the top and bottom ends, and a vent outlet;
   a wall dividing the internal cavity into a first chamber and a second chamber, wherein the first chamber defined between the bottom end of the body and the wall, the second chamber defined between the top end of the body and the wall, and the second chamber is in communication with the vent outlet;
   a first aperture extending through the wall between the first chamber and the second chamber;
   a second aperture extending through the wall between the first chamber and the second chamber, the second aperture offset from the first aperture;
   an umbrella valve coupled to the wall, the umbrella valve having a central passage extending through the first aperture and an umbrella portion extending radially outwardly from the central passage, the umbrella portion being positioned within the second chamber and configured to engage a top side of the wall to selectively seal the second aperture; and
   a float positioned within the first chamber, the float having an engagement portion that is insertable into the central passage of the umbrella valve to seal the first aperture,
   wherein the umbrella portion is configured to deform away from the top side of the wall to vent a gas along a first pathway from the first chamber to the vent outlet via the second aperture in response to pressure within the first chamber exceeding a cracking pressure of the umbrella valve.

2. The valve assembly of claim 1, wherein the float is moveable between a first position, in which the engagement portion is spaced from the central passage of the umbrella valve to permit venting of the gas along a second pathway from the first chamber to the vent outlet via the first aperture, and a second position, in which the engagement portion seals the central passage to inhibit the gas from flowing through the first aperture.

3. The valve assembly of claim 2, further comprising a head weight positioned on a top side of the central passage.

4. The valve assembly of claim 3, wherein the head weight is spherical.

5. The valve assembly of claim 3, wherein the umbrella valve includes a groove adjacent the top side of the central passage, and wherein the second pathway extends through the groove.

6. The valve assembly of claim 2, further comprising:
   an end cap coupled to the body and that encloses the first chamber, and
   a spring positioned between the end cap and the float, wherein the spring is configured to urge the float towards engagement with a bottom side of the central passage.

7. The valve assembly of claim 6, wherein the float defines a longitudinal axis, wherein the float is movable along the longitudinal axis between the first position and the second position, and wherein the spring is configured to move the float to the second position in response to the longitudinal axis being tipped beyond a threshold tip angle, the threshold tip angle being between 15 degrees and 85 degrees relative to vertical.

8. The valve assembly of claim 1, further comprising:
   a liquid outlet coupled to the body, the liquid outlet having a first end portion extending outside of the container and a second end portion positioned within the container; and
   a pick up tube coupled to the second end portion of the liquid outlet such that liquid from the container is able to be drawn out of the liquid outlet via the pick up tube.

9. The valve assembly of claim 8, wherein the liquid outlet extends parallel to the vent outlet.

10. The valve assembly of claim 1, further comprising a housing insert positioned within the internal cavity of the body, wherein the housing insert defines the wall that separates the internal cavity into the first chamber and the second chamber.

11. The valve assembly of claim 2, wherein the float is movable to the second position in response to liquid from the container submerging at least a portion of the float.

12. The valve assembly of claim 1, wherein the umbrella valve is made of fluorosilicone rubber.

13. A valve assembly configured to be coupled to a container, the valve assembly comprising:
   a body engageable with the container, the body having a top end, a bottom end spaced from the top end, an internal cavity defined between the top and bottom ends, and a vent outlet;
   a wall dividing the internal cavity into a first chamber and a second chamber, wherein the first chamber defined between the bottom end of the body and the wall, the second chamber defined between the top end of the body and the wall, and the second chamber is in communication with the vent outlet;
   a first aperture extending through the wall between the first chamber and the second chamber;
   a second aperture extending through the wall between the first chamber and the second chamber, the second aperture offset from the first aperture; and
   a valve having:
      a first state in which a gas is able to flow along a first pathway from the first chamber to the vent outlet via the first aperture, and
      a second state in which the first pathway is blocked, wherein the gas is able to flow along a second pathway from the first chamber to the vent outlet via the second aperture in response to pressure within the first chamber exceeding a cracking pressure of the valve when the valve is in the second state, wherein the valve includes an umbrella valve having a groove adjacent a top side of the umbrella valve, and wherein the first pathway extends through the groove.

14. The valve assembly of claim 13, wherein the valve includes a float, wherein the float is spaced from the umbrella valve in the first state, and wherein the float engages the umbrella valve in the second state.

15. The valve assembly of claim 14, wherein the valve includes a head weight positioned on the top side of the umbrella valve.

16. The valve assembly of claim 14, wherein the float is movable along a longitudinal axis, and wherein the valve is configured such that the float moves into engagement with the umbrella valve in response to the longitudinal axis being tipped beyond a threshold tip angle, the threshold tip angle being between 15 degrees and 85 degrees relative to vertical.

17. The valve assembly of claim 14, wherein the float is movable into engagement with the umbrella valve in response to liquid from the container submerging at least a portion of the float.

18. A method of assembling a valve assembly, the method comprising:

providing a body having a top end, a bottom end spaced from the top end, and an internal cavity defined between the top and bottom ends, the body defining a vent outlet;

inserting a central passage of an umbrella valve into a first aperture formed in a wall until an umbrella portion of the umbrella valve, which extends radially outwardly from the central passage, engages a top side of the wall to seal a second aperture offset from the first aperture;

inserting a float into a first chamber defined below the wall, the float having an engagement portion that is sized to be received within the central passage of the umbrella valve;

inserting a spring into the first chamber; and coupling an end cap to the bottom end of the body to secure the float and the spring within the first chamber such that the spring biases the float toward the central passage of the umbrella valve.

19. The method of claim 18, wherein the wall is part of a housing insert, and wherein the method further comprises inserting the housing insert into the internal cavity through the bottom end of the body before coupling the end cap to the bottom end of the body, such that the end cap retains the housing insert within the internal cavity.

20. The method of claim 18, wherein the end cap is a first end cap, and wherein the method further comprises inserting a head weight into a second chamber defined above the wall, and coupling a second end cap to the top end of the body to enclose the head weight within the second chamber.

* * * * *